United States Patent
Hirsch et al.

(10) Patent No.: US 10,583,802 B2
(45) Date of Patent: Mar. 10, 2020

(54) IN OR RELATING TO AIR-BAGS

(71) Applicants: Brita Hirsch, Cheshire East (GB); Ralf Koehnen, Cheshire (GB)

(72) Inventors: Brita Hirsch, Macclesfield (GB); Ralf Koehnen, Congleston (GB)

(73) Assignee: AUTOLIV DEVELOPMENT AB, Vargarda (SE)

( * ) Notice: Subject to any disclaimer, the term of this patent is extended or adjusted under 35 U.S.C. 154(b) by 97 days.

(21) Appl. No.: 14/761,149

(22) PCT Filed: Jan. 14, 2014

(86) PCT No.: PCT/SE2014/050028
§ 371 (c)(1),
(2) Date: Jul. 15, 2015

(87) PCT Pub. No.: WO2014/112931
PCT Pub. Date: Jul. 24, 2014

(65) Prior Publication Data
US 2015/0360639 A1 Dec. 17, 2015

(30) Foreign Application Priority Data
Jan. 21, 2013 (EP) .................................. 13152105

(51) Int. Cl.
*B60R 21/235* (2006.01)
*D03D 1/02* (2006.01)
(Continued)

(52) U.S. Cl.
CPC ............. *B60R 21/235* (2013.01); *D03D 1/02* (2013.01); *D03D 13/002* (2013.01); *D03D 49/62* (2013.01);
(Continued)

(58) Field of Classification Search
CPC ...... D03D 13/002; D03D 1/0088; D03D 1/02; D03D 2401/18; B60R 2021/23542; B60R 2021/23547; G06F 17/5018
See application file for complete search history.

(56) References Cited

U.S. PATENT DOCUMENTS 3,008,213 A * 11/1961 Foster .................. A47C 27/081
139/410
4,312,913 A * 1/1982 Rheaume ............... D03D 11/00
139/408

(Continued)

FOREIGN PATENT DOCUMENTS

DE 20200601 U1 4/2002
EP 0263392 A2 4/1988
(Continued)

OTHER PUBLICATIONS

International Search Report and Written Opinion of the ISA for PCT/SE2014/050028, ISA/SE, Stockholm, dated May 8, 2014.
(Continued)

*Primary Examiner* — Paul N Dickson
*Assistant Examiner* — Timothy Wilhelm
(74) *Attorney, Agent, or Firm* — Stephen T. Olson; Harness, Dickey & Pierce, P.L.C.

(57) ABSTRACT

A method of weaving fabric for use in the manufacture of a vehicle air-bag includes: providing a weaving reed having a plurality of adjacent cells; introducing regular warp yarns into at least some of the cells; introducing an additional warp yarn into one of the cells that already includes a regular warp yarn; and carrying out a weaving process. In the weaving process, weft yarns are interwoven with the regular warp yarns and the additional warp yarn. The regular warp yarns each remain within one cell throughout the weaving process.

(Continued)

The additional warp yarn is moved from a first cell to a second cell during the weaving process.

18 Claims, 2 Drawing Sheets

(51) Int. Cl.
  *D03D 49/68* (2006.01)
  *D03D 13/00* (2006.01)
  *D03D 49/62* (2006.01)
(52) U.S. Cl.
  CPC .... *D03D 49/68* (2013.01); *B60R 2021/23509* (2013.01); *B60R 2021/23542* (2013.01); *D10B 2401/063* (2013.01); *D10B 2401/16* (2013.01); *D10B 2505/124* (2013.01)

(56) References Cited

U.S. PATENT DOCUMENTS

| | | | | |
|---|---|---|---|---|
| 4,654,748 | A * | 3/1987 | Rees | D03D 15/0005 139/422 |
| 5,097,784 | A * | 3/1992 | Baudet | B29C 33/307 114/102.31 |
| 5,302,432 | A * | 4/1994 | Shigeta | B32B 27/12 280/728.1 |
| 5,431,193 | A * | 7/1995 | Mood | D03D 41/004 139/11 |
| 5,501,259 | A * | 3/1996 | Palm | B29C 33/50 156/156 |
| 5,768,875 | A * | 6/1998 | Bergen | D02G 3/446 280/739 |
| 5,775,381 | A | 7/1998 | Addis | |
| 5,800,883 | A * | 9/1998 | Koseki | B60R 21/235 280/728.1 |
| 6,131,949 | A * | 10/2000 | Lewis | B60R 21/017 280/733 |
| 6,283,507 | B1 * | 9/2001 | Kami | B60R 21/233 139/389 |
| 6,608,438 | B2 * | 8/2003 | Topelberg | H05B 33/26 313/491 |
| 6,733,211 | B1 * | 5/2004 | Durie | D03D 11/00 139/383 R |
| 6,883,557 | B1 * | 4/2005 | Eschbach | D03D 1/02 139/384 R |
| 7,191,803 | B2 * | 3/2007 | Orr | A61B 5/0002 139/408 |
| 7,592,276 | B2 * | 9/2009 | Hill | D02G 3/441 313/511 |
| 7,820,566 | B2 * | 10/2010 | Breed | B60R 21/235 139/383 R |
| 8,276,938 | B2 * | 10/2012 | Yamamoto | B60R 21/232 280/730.2 |
| 8,475,905 | B2 * | 7/2013 | Abrams | D06P 5/004 428/343 |
| 8,770,235 | B2 | 7/2014 | Wahhoud et al. | |
| 8,783,903 | B2 * | 7/2014 | Bhattacharya | G09F 9/33 29/592.1 |
| 8,822,357 | B2 * | 9/2014 | Breed | B32B 5/024 280/728.1 |
| 9,283,922 | B2 * | 3/2016 | Fischer | B60R 21/2334 |
| 2006/0163856 | A1 * | 7/2006 | Lehmann | B60R 21/239 280/743.1 |
| 2007/0087149 | A1 * | 4/2007 | Arthurs | D02G 3/441 428/36.1 |
| 2007/0089800 | A1 * | 4/2007 | Sharma | D02G 3/441 139/388 |
| 2009/0272455 | A1 * | 11/2009 | Speich | D03D 1/0088 139/22 |
| 2010/0163283 | A1 * | 7/2010 | Hamedi | D03D 1/0088 174/254 |
| 2014/0021705 | A1 * | 1/2014 | Youn | B60R 21/235 280/730.1 |

FOREIGN PATENT DOCUMENTS

| | | | |
|---|---|---|---|
| EP | 2531639 A1 | 12/2012 | |
| JP | 04-082938 | * 3/1992 | ............ D03D 13/00 |
| WO | WO-2004059054 A1 | 7/2004 | |
| WO | WO-2010004284 A1 | 1/2010 | |
| WO | WO-2012022641 A2 | 2/2012 | |

OTHER PUBLICATIONS

Office Action regarding KR10-2015-7018530, dated Mar. 3, 2017. Translation provided.

* cited by examiner

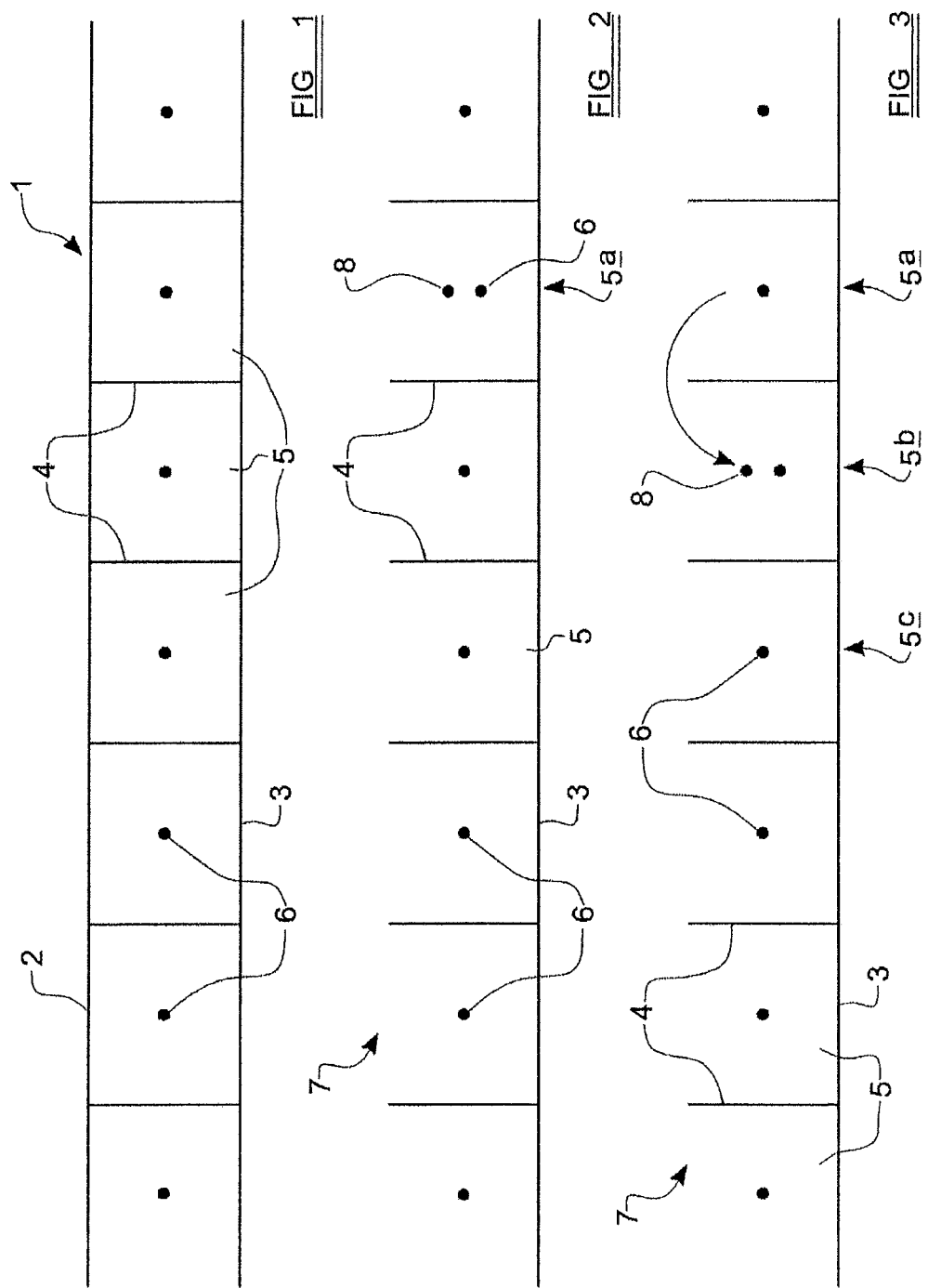

IN OR RELATING TO AIR-BAGS

CROSS-REFERENCE TO RELATED APPLICATIONS

This application is a 371 U.S. National Stage of International Application No. PCT/SE2014/050028, filed Jan. 14, 2015, which claims the benefit of and priority to European Patent Application No. 13152105.6, filed Jan. 21, 2013. The disclosures of the above applications are incorporated herein by reference.

FIELD

THIS INVENTION relates to air-bags, and in particular to the weaving of fabric to be used in the construction and manufacture of vehicle air-bags.

DISCUSSION

Most vehicle air-bags are formed from one or more sheets of woven fabric which are sealed together to form at least one inflatable chamber. During activation of the air-bag, pressurised gas is introduced rapidly into the chamber, causing the air-bag to inflate.

Conventionally, sheets of fabric for use in the manufacture of air-bags are formed from interwoven warp and weft yarns or threads. The warp and weft yarns are arranged substantially at right angles to one another and interwoven so that, as each warp yarn is followed along its length, it passes alternately under and over successive weft yarns that are encountered. Similarly, as one passes along the length of each weft yarn, the weft yarn passes alternatively over and under successive warp yarns that are encountered.

It has been found that fabrics woven in this way generally display relatively high tensile strength in the direction which is substantially aligned with the warp yarns, and also in the direction that is aligned with the weft yarns. However, if tensile forces are applied to the fabric in a direction which is at around 45° to the warp and weft yarns, the fabric is significantly weaker and more elastic.

The skilled person will understand that there are many different designs of vehicle air-bag. Through shaped seams and/or internal tethers, many different 3-dimensional shapes can be achieved. With more complex shapes, it is increasingly likely that, during inflation of an air-bag, large forces will be placed on a region of the fabric in a direction which is at around 45° to the warp and weft yarns of the fabric. This therefore represents a weak point and is a potential source of failure during inflation of the air-bag. There is also the problem that, if the entire air-bag is formed from fabric that is strong enough not to fail at the weak point, much of the air-bag will be "over-engineered" and unnecessarily heavy and expensive.

SUMMARY

It is an object of the present invention to seek to address at least some of these difficulties.

Accordingly, one aspect of the present invention provides a method of weaving fabric for use in the manufacture of a vehicle air-bag, the method comprising: providing a weaving reed having a plurality of adjacent cells; introducing regular warp yarns into at least some of the cells; introducing an additional warp yarn into one of the cells that already includes a regular warp yarn; and carrying out a weaving process in which: weft yarns are interwoven with the regular warp yarns and the additional warp yarn; the regular warp yarns each remain within one cell throughout the weaving process; and the additional warp yarn is moved from a first cell to a second cell during the weaving process.

Advantageously, the additional warp yarn is repeatedly moved from one cell to another cell after a set number of weft yarns have been interwoven with regular warp yarns and the additional warp yarn.

Preferably, the additional warp yarn has properties which are different from those of the regular warp yarns.

Conveniently, the additional warp yarn has significantly higher tensile strength than the regular warp yarns.

Advantageously, the additional warp yarn is a conductive element.

Preferably, the method further comprises two or more additional warp yarns.

Conveniently, the additional warp yarn is moved during the weaving process so as to follow an irregular path through the finished fabric.

Another aspect of the present invention provides an air-bag formed from a fabric that is woven in accordance with any preceding claim.

Advantageously, the air-bag has a region which, during inflation of the air-bag, is expected to experience large tensile forces in a first direction, and wherein the additional warp yarn is arranged to be in the selected region, and arranged substantially parallel to the first direction.

Preferably, the first direction is at an angle with respect to the orientation of the regular warp yarns.

Conveniently, the angle is at least 10°.

A further aspect of the present invention provides a method of manufacturing an air-bag comprising the steps of: designing an air-bag, or receiving a design for an air-bag; identifying an area of the air-bag which, during inflation, is likely to experience large forces in a first direction; weaving a fabric in accordance with any one of the above; and forming the air-bag, including the woven fabric, so that the additional warp yarn passes through the identified region, and lies substantially parallel with the first direction.

Another aspect of the present invention provides a vehicle comprising an air-bag module including an air-bag according to the above, wherein the additional warp yarn is a conductive element, wherein an input device is provided, and a signal generated by the input device my be carried by the additional warp yarn to another component of the vehicle.

Advantageously, the signal is an electrical signal.

DESCRIPTION OF THE DRAWINGS

In order that the present invention may be more readily understood embodiments thereof will now be described, by way of example, with reference to the accompanying drawings, in which:

FIG. 1 shows a conventional weaving process for an air-bag fabric;

FIGS. 2 and 3 show steps in a weaving process embodying the present invention;

DETAILED DESCRIPTION

Figure 4:
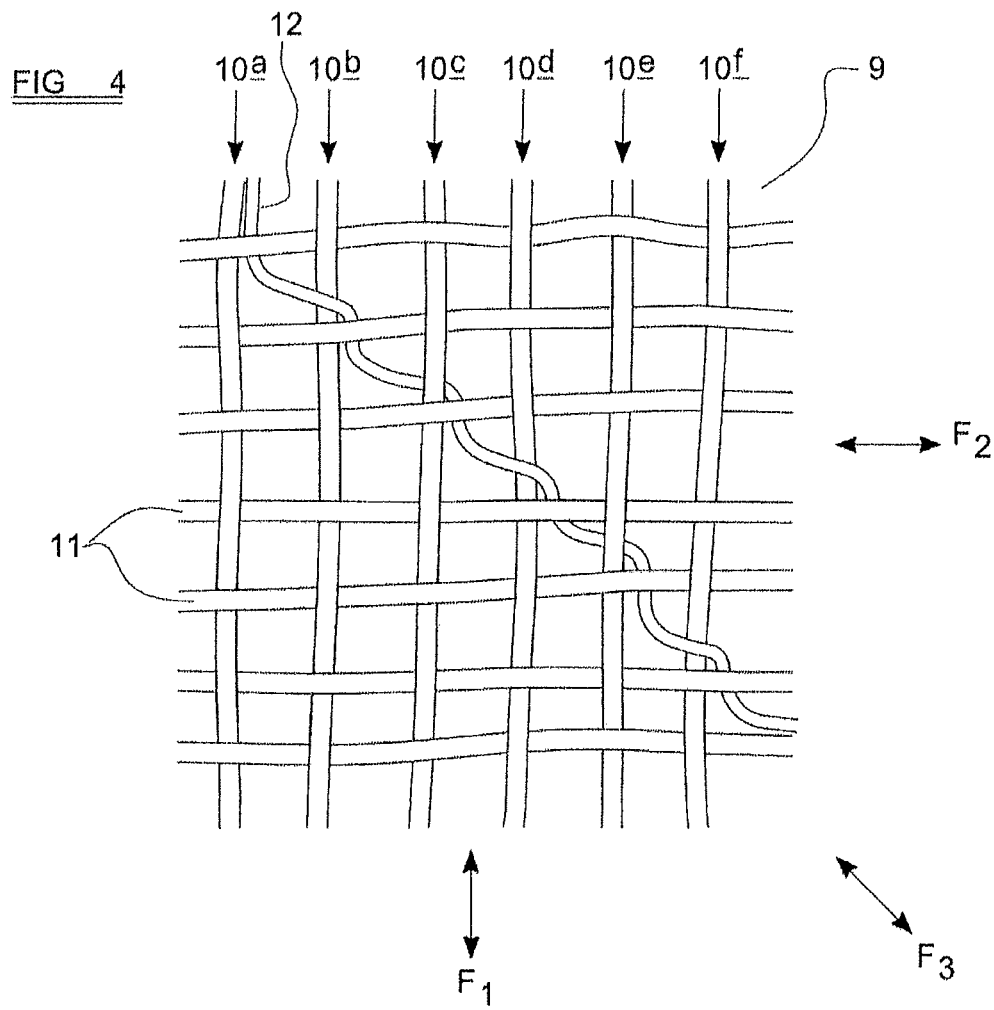
FIG. 4 shows a region of a fabric embodying the present invention.

FIG. 1 is a schematic view of a reed 1 that is used as part of the process for weaving fabric for use in a conventional air-bag. The reed 1 comprises front and back guide surfaces 2, 3. Extending between the front and back guide surfaces 2, 3 is a series of dividers 4. A series of enclosed cells 5 are therefore defined between the dividers 4.

The reed 1 is open at its top and bottom surfaces (in other words, in the directions passing directly into, and out of, the plane of the paper in FIG. 1).

In use, one warp yarn 6 is passed through each cell 5 of the reed 1. This therefore constrains and guides the warp yarns 6 during the weaving process. It will be understood that weft yarns (not shown) will be interwoven with the warp yarns 6, and the weft yarns will pass generally in the left-right direction, as shown in FIG. 1.

Because enclosed cells 5 are formed by the front and back guide surfaces 2, 3 and the dividers 4, the reed 1 shown in FIG. 1 is known as a closed reed.

FIG. 2 shows an alternative reed 7. The alternative reed 7 has a rear guide surface 3, with a series of dividers 4 extending therefrom, but the front guide surface is missing. The cells 5 formed between the dividers 4 are therefore open on the front side (i.e. the side facing towards the top of the page in FIG. 2), and the reed 7 generally resembles a comb. A reed of this type is known as an open reed.

Respective warp yarns 6 are once again received in each of the cells 5. It will be understood that, in order to be sure that the warp yarns 6 remain within the cells 5 during the weaving process, the warp yarns 6 may need to be biased towards the rear side 3 of the reed and/or the dividers 4 need to be of sufficient length to retain the warp yarns 6 in place.

In the arrangement shown in FIG. 2, an additional warp yarn 8 is present in a first one 5a of the cells 5. The additional yarn 8 is present within the first cell 5a in addition to the regular warp yarn 6 that is held within this cell 5a.

The skilled person will understand how the additional yarn 8 may be introduced into the first cell 5a. In preferred embodiments the regular warp yarns 6 are fed to the loom in a constant supply, and the additional warp yarn 8 is held by a movable guide bar (not shown) which has a delivery tip positioned near the reed 7. The additional warp yarn 8 is fed through the delivery tip of the guide bar into the desired one of the cells 5.

During a first step of a weaving process embodying the present invention, the additional yarn 8 is held within the first cell 5a. A first weft yarn (not shown) is interwoven with the warp yarns 6, 8 that are held by the reed 7.

Once the weaving of the first weft yarn is complete, the additional warp yarn 8 is moved from the first cell 5a to an adjacent, second cell 5b.

In preferred embodiments of the invention, the movement of the additional warp yarn 8 between cells 5 is achieved by manoeuvring the guide bar to move the additional yarn 8 out of the open front end 2 of the reed 7, along the length of the reed 7 to be aligned with a further cell 5, and then moved once again towards the rear side 3 of the reed 7 to be held within the further cell 5.

The skilled person will appreciate that other techniques may be used to move the additional yarn(s) between cells, and the invention is not limited to the method described above.

Once the additional yarn 8 is received within the second cell 5b, one or more further weft yarns (not shown) can then be interwoven with the warp yarns 6, 8 that are held by the reed 7.

Once this further weaving of one or more weft yarns has been completed, the additional warp yarn 8 may be moved again, either to a third cell 5c adjacent to the second cell 5b, back to the first cell 5a, to a different cell entirely, or out of the reed 7 altogether.

FIG. 4 shows a region 9 of fabric woven according to the present invention. As discussed above the fabric is formed from interwoven "regular" warp yarns 10a-10f and weft yarns 11, which are arranged so as to be substantially at right angles to one another. In addition to these yarns 10a-10f, 11, an additional warp yarn 12 is included in the region 9 of fabric. During the weaving of the region 9 of fabric, the additional warp yarn 12 was initially in the same cell as a first regular warp yarn 10a. As successive weft yarns 11 were interwoven with the warp yarns 10a to 10f, the additional warp yarn 12 was moved one cell along (as described above), so as to lie with the second regular warp yarn 10b, then the third regular warp yarn 10c, and so on.

As can be seen from FIG. 4, the result is that the additional warp yarn 12 describes a generally diagonal path through the fabric, which is substantially at 45° with respect to the warp and weft yarns 10a-10f, 11.

It will be understood that, without the inclusion of the additional warp yarn 12, the region 9 of fabric would be relatively robust against tensile forces applied in a direction that is substantially parallel with the warp yarns 10a-10f (indicated by arrow $F_1$ in FIG. 4), and also to tensile forces applied in a direction which is parallel with the weft yarns 11 (indicated by arrow $F_2$ in FIG. 4). However, the region 9 of fabric would have stretched and/or broken more easily if subject to tensile forces applied in a direction substantially at 45° to the warp and weft yarns 10a-10f, 11 (indicated by arrow $F_3$ in FIG. 4).

However, with the inclusion of the additional warp yarn 12, the region 9 of fabric is much more robust against stretching and breaking when tensile forces applied to the fabric in the direction $F_3$ that is at 45° to the warp and weft yarns 10a-10f, 11.

As those skilled in the art will be aware, the strength of each warp and weft yarn of a fabric is carefully selected. Clearly, a fabric formed from stronger yarn will have more desirable mechanical properties. However, stronger yarns are generally heavier and/or more expensive than weaker yarns. The weight of the fabric (i.e. the mass per unit area of fabric) is of critical importance, since it is desirable to reduce the overall weight of the air-bag module that must be carried by a vehicle. Air-bag fabric must also be no more expensive than is necessary.

Returning to FIG. 4, if the additional warp yarn 12 is a strengthening yarn, it is likely to be possible to use a relatively strong, heavy, expensive yarn as the additional warp yarn 12. This is because the overall length or quantity of the additional warp yarn 12 that is included as part of the fabric is very small compared to the overall length or quantity of the regular warp and weft yarns 10a-10f, 11.

The angle of the additional warp yarn 12, with respect to the regular yarns 10a-10f, 11 of the fabric, can be controlled by varying the movement of the additional warp yarn 12 through the cells of the reed during the weaving process. For instance, the weaving process may be arranged so that the additional warp yarn is moved along by one cell after every two, three or more weft yarns have been interwoven with the warp yarns. This would result in an additional warp yarn which is arranged at a shallower angle with respect to the regular warp yarns (i.e. closer to the vertical, as shown in FIG. 4).

In other examples, the weaving process may be set up so that the additional warp yarn is moved along by more than one cell of the reed after each weft yarn is interwoven with the warp yarns. This will result in the additional warp yarn being arranged at a greater angle with respect to the regular warp yarn yarns (i.e. closer to the horizontal, in the orientation shown in FIG. 4).

Other, intermediate angles may be achieved by varying the periodicity with which the additional warp yarn is moved from one cell to another, for instance by moving the additional warp yarn along by one cell after the weaving of every two weft yarns, then every three weft yarns, then every two weft yarns again, and so on. A skilled person will understand how this can be achieved.

In the embodiment shown in FIGS. 1 to 4, only one additional warp yarn is shown. However, it should be understood that any number of additional warp yarns can be provided. These additional warp yarns may travel together during the weaving of the fabric, i.e. as any weft yarn is interwoven with the warp yarns, all of the additional warp yarns are received in the same cell. Alternatively, the additional warp yarns may be received in different cells as the weft yarns are woven. The additional warp yarns may be moved along the cells of the reed in different patterns to one another, at different rates, and following different paths. It should be understood that additional yarns can follow complex, irregular and/or convoluted paths through the fabric, as required.

It will be appreciated that, in embodiments of the present invention, strengthening yarns in any desired configuration can be included in fabric used to form a vehicle air-bag. In particular, it is expected that the strengthening yarns will be configured so as to run through areas of the fabric which are expected to be under particularly high stress during inflation and deployment of the air-bag, particularly where these stresses are likely to act at an angle (e.g. in excess of 10° or 30°) with respect to the warp and weft yarns. A skilled person will realise how these areas may be identified, and how strengthening yarns may then be included in the fabric so as to run through areas of likely high stress, and be angled and oriented so as to resist the forces that are likely to act on the fabric during inflation and deployment.

Figure 5:
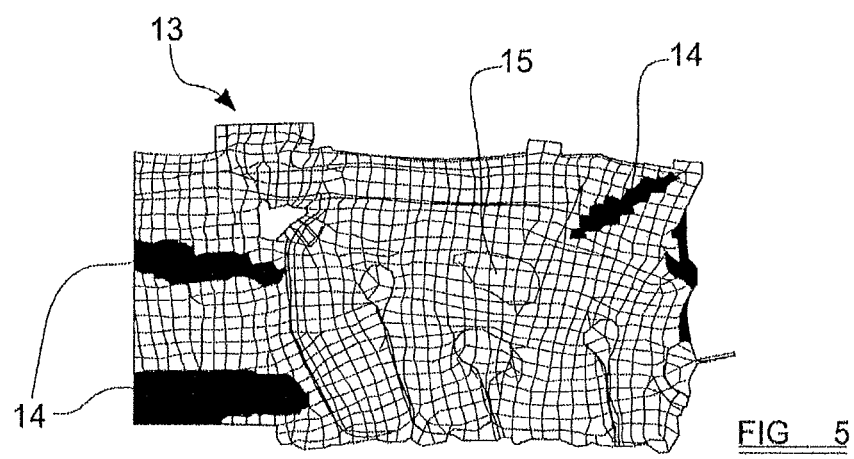
FIG. 5 shows a CAD analysis of an inflated air-bag.

Referring to FIG. 5, a CAD model of an inflated air-bag 13 is shown, with regions of varying stress highlighted. The dark areas indicated at 14 represent relatively low stress, and the substantially kidney-shaped light grey area 15 in the centre of the air-bag represents relatively high stress. In this high-stress area 15, the grid lines in FIG. 5 are representative of the alignment of the warp and weft fibres of the fabric of the air-bag 13. In the high-stress area 15, large tensile forces will act in all directions, including at around 45° to the warp and weft fibres. It will be understood that the high-stress area 15 represents a possible failure point of the air-bag 13 when the air-bag 13 inflates, particularly if the air-bag 13 is subject to a heavy impact.

In an embodiment of the invention, one or more additional strengthening yarns may be included in the fabric of the air-bag 13, running through the high-stress area 15. For instance, an additional strengthening yarn might run at approximately 45° to warp and weft fibres, in the top left-bottom right direction, as seen in FIG. 5. A further additional strengthening yarn may run through the high-stress area 15 in the top right-bottom left direction, as seen in FIG. 5. In further embodiments several additional yarns may be included in the high-stress area 15, and these may be spaced apart and/or generally colinear.

It will be understood how analysis of this type may allow the identification of potentially weak areas in air-bags, and the introduction of additional yarns to strengthen the weak areas in an effective manner without unduly increasing the weight and cost of the air-bag.

Of course, other methods may be used to identify weak areas in air-bags, for instance the inspection of air-bags that have undergone inflation, either in a testing facility or in a crash condition.

Additional yarns woven into fabric in embodiments of the invention may be stronger, or otherwise have different properties than, the yarns which are used to form the regular warp and/or weft yarns of the fabric. In alternative embodiments, the additional yarn may be formed to be the same, or substantially the same, as the yarns used to form the regular warp and/or weft yarns.

It is also envisaged that, in embodiments of the invention, additional yarns may have a data transmission, instead of (or as well as) a strengthening function. For instance, a conductive element in the form of a thread, yarn, fibre or wire, for instance formed from a conductive metal, may be woven as part of an air-bag fabric, in the manner described above.

This conductive element may then be used to transmit data between other components. For instance, the air-bag may, prior to deployment, be provided as part of an air-bag module which is positioned within the centre of a steering wheel of the vehicle. The air-bag fabric may be arranged such that, when a central portion of the steering wheel is depressed, a circuit is completed including the conductive element as part of the circuit, and the horn of the vehicle is sounded.

Alternatively, the conductive element may be used to transmit a signal from a control element, such as an indicator stalk, on one side of the steering wheel to another location, for instance to the other side of the steering wheel.

The skilled person will readily understand how conductive (or otherwise data-transmitting) elements may be interwoven with an air-bag fabric to serve a useful purpose within a vehicle. The skilled person will realise that this can reduce the overall cost and complexity of the vehicle's data transmission arrangements, since there is no need to provide and install a separate data transmission element passing across the air-bag module.

Where a conductive element, such as a metallic element, is interwoven as part of an air-bag fabric, it is envisaged that the air-bags should be arranged so that, when the air-bag is activated, the conductive element lies on a surface of the air-bag that is not likely to come into contact with a vehicle occupant. This is because, when a vehicle air-bag is activated, the gas that is introduced into the interior of the air-bag may be at a very high temperature. A metallic element may therefore also be heated very quickly to high temperature and, if the heated metallic element comes into contact with a vehicle occupant, this may result in a burn or other injury.

It will be appreciated that embodiments of the invention can provide strengthened and reinforced air-bag fabrics that will find application in many different types of vehicle air-bag.

In the description above, the additional yarns that are introduced into the fabric are described as being warp yarns. It should, however, be understood that the additional yarns could equally be weft yarns instead of, or as well as, warp yarns. The invention is not limited to the introduction of only additional warp yarns.

In the specification the term "yarn" is used to refer to elongate elements such as threads and fibres that are interwoven. It should be understood that this term is not intended to limit the invention to any particular type of elongate element. It is envisaged that the invention may be used with elongate elements that are monofilament, multifilament or of any other type formed from any suitable material.

When used in this specification and claims, the terms "comprises" and "comprising" and variations thereof mean that the specified features, steps or integers are included. The terms are not to be interpreted to exclude the presence of other features, steps or components.

CLAIMS

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of manufacturing an air-bag reinforced in areas of high stress, the method comprising:
   generating a computer aided design (CAD) model of an inflated air-bag;
   identifying a virtual area of high stress on the CAD model of the inflated air-bag;
   forming the air-bag from a fabric including a plurality of weft yarns and a plurality of warp yarns perpendicular to the weft yarns; and
   prior to forming the air-bag from the fabric, targeting an actual area of the fabric corresponding with the virtual area of high stress on the CAD model of the inflated air-bag for reinforcement by weaving at least one additional yarn into the actual area of the fabric along a line askew to both the weft yarns and warp yarns,
   wherein forming the air-bag includes weaving the fabric by:
   providing a weaving reed having a plurality of adjacent cells;
   introducing warp yarns into at least some of the cells;
   introducing the at least one additional yarn into one of the cells that already includes a warp yarn; and
   strengthening the fabric to withstand tensile forces applied to the fabric along the line askew to the weft yarns and warp yarns by carrying out a weaving process in which:
   weft yarns are interwoven with the warp yarns and the at least one additional yarn;
   the warp yarns each remain within one cell throughout the weaving process; and
   the at least one additional yarn is moved from a first cell to a second cell during the weaving process.

2. The method according to claim 1, wherein weaving at least one additional yarn into the actual area of the fabric along a line askew to both the weft yarns and warp yarns comprising weaving a plurality of yarns into the actual area of the fabric each along a line askew to both the weft yarns and warp yarns.

3. The method of claim 1, wherein the at least one additional yarn has properties which are different from those of the warp yarns of the plurality of warp yarns.

4. The method of claim 1, wherein the at least one additional yarn includes two or more additional yarns.

5. The method of claim 1, wherein the at least one additional yarn follows an irregular path through the fabric.

6. The method of claim 1, wherein the at least one additional yarn is at an angle of at least 10° with respect to the warp yarns.

7. The method of claim 1, wherein the at least one additional warp yarn is at an angle of 45° relative the warp yarns.

8. A method of manufacturing an air-bag, the method comprising:
   identifying a high stress area for the air-bag;
   forming the air-bag from a fabric including a plurality of weft yarns and a plurality of warp yarns perpendicular to the weft yarns; and
   prior to forming the air-bag from the fabric, targeting the high stress area for reinforcement by weaving at least one additional yarn into the fabric along a line askew to both the weft yarns and warp yarns and in a fabric area corresponding to the high stress area,
   wherein forming the air-bag includes weaving the fabric by:
   providing a weaving reed having a plurality of adjacent cells;
   introducing warp yarns into at least some of the cells;
   introducing the at least one additional yarn into one of the cells that already includes a warp yarn; and
   strengthening the fabric to withstand tensile forces applied to the fabric along the line askew to the weft yarns and warp yarns by carrying out a weaving process in which:
   weft yarns are interwoven with the warp yarns and the at least one additional yarn;
   the warp yarns each remain within one cell throughout the weaving process; and
   the at least one additional yarn is moved from a first cell to a second cell during the weaving process.

9. The method of claim 8, wherein reinforcing the high stress area includes weaving a plurality of yarns into the fabric each along a line askew to both the weft yarns and warp yarns and in the fabric area corresponding to the high stress area.

10. The method of claim 8, wherein the at least one additional yarn has properties which are different from those of the warp yarns of the plurality of warp yarns.

11. The method of claim 8, wherein the at least one additional yarn has significantly higher tensile strength than the warp yarns.

12. The method of claim 8, wherein the at least one additional yarn follows an irregular path through the fabric.

13. The method of claim 8, wherein the at least one additional yarn is at an angle of at least 10° with respect to the warp yarns.

14. The method of claim 8, wherein the at least one additional warp yarn is at an angle of 45° relative the warp yarns.

15. A method of manufacturing an air-bag, the method comprising:
   identifying a high stress area for the air-bag;
   forming the air-bag from a fabric including a plurality of weft yarns and a plurality of warp yarns perpendicular to the weft yarns; and
   prior to forming the air-bag from the fabric, targeting the high stress area for reinforcement by weaving at least one additional yarn into the fabric in a fabric area corresponding to the high stress area,
   wherein forming the air-bag includes weaving the fabric by:
   providing a weaving reed having a plurality of adjacent cells;
   introducing warp yarns into at least some of the cells; and
   strengthening the fabric to withstand tensile forces applied to the fabric by introducing the at least one additional yarn into one of the cells that already includes a warp yarn and advancing the at least one additional yarn along an irregular path through the fabric,
wherein movement of the at least one additional yarn through the cells of the weaving read is varied during a weaving process, and
wherein the at least one additional yarn is moved along by one cell after a first predetermined number of weft yarns is interwoven with warp yarns and subsequently moved by an additional one cell after a second predetermined number of weft yarns is interwoven with the warp yarns, the first predetermined number of weft yarns being different than the second predetermined number of weft yarns.

16. The method of claim 15, the first predetermined number of weft yarns is two and the second predetermined number of weft yarns is at least three.

17. The method of claim 15, wherein a periodicity with which the at least one additional yarn is moved from one cell to another is varied by moving the at least one additional yarn by one cell after the weaving of a first predetermined number of weft yarns is interwoven with the warp yarns and subsequently moved by an additional one cell after a second predetermined number of weft yarns is interwoven with the warp yarns, the first predetermined number of weft yarns being different than the second predetermined number of weft yarns.

18. A method of manufacturing an air-bag, the method comprising:
identifying a high stress area for the air-bag;
forming the air-bag from a fabric including a plurality of weft yarns and a plurality of warp yarns perpendicular to the weft yarns; and
prior to forming the air-bag from the fabric, targeting the high stress area for reinforcement by weaving at least one additional yarn into the fabric in a fabric area corresponding to the high stress area,
wherein forming the air-bag includes weaving the fabric by:
providing a weaving reed having a plurality of adjacent cells;
introducing warp yarns into at least some of the cells; and
strengthening the fabric to withstand tensile forces applied to the fabric by introducing the at least one additional yarn into one of the cells that already includes a warp yarn and advancing the at least one additional yarn along an irregular path through the fabric,
wherein a periodicity with which the at least one additional yarn is moved from one cell to another is varied by moving the at least one additional yarn by one cell after the weaving of a first predetermined number of weft yarns is interwoven with the warp yarns and subsequently moved by an additional one cell after a second predetermined number of weft yarns is interwoven with the warp yarns, the first predetermined number of weft yarns being different than the second predetermined number of weft yarns.

* * * * *